United States Patent Office 3,011,121
Patented Nov. 28, 1961

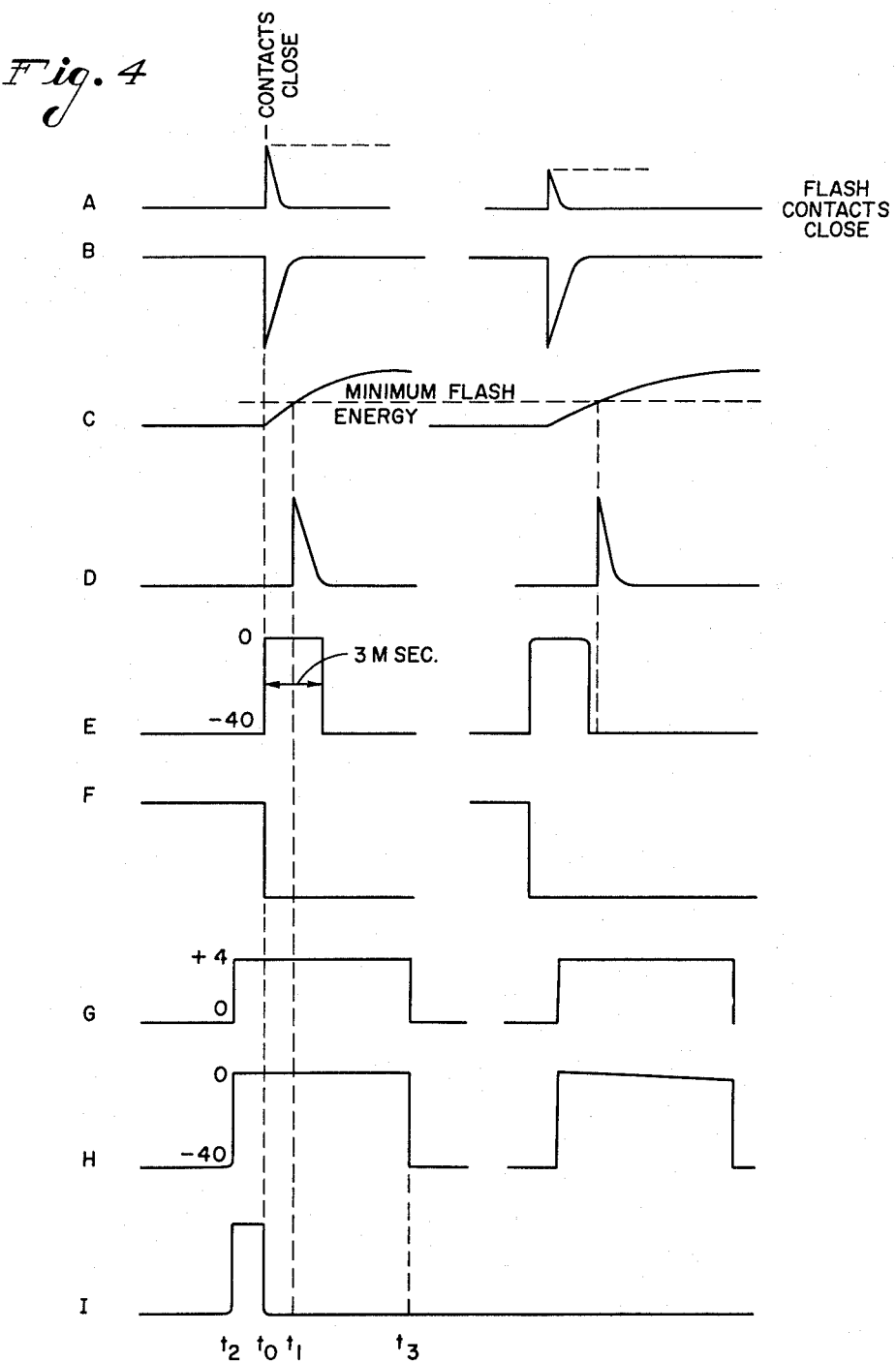

3,011,121
TIMING SYSTEMS
Robert F. Herrman, Rochester, and William T. Lucas, Pittsford, N.Y., assignors to General Dynamics Corporation, Rochester, N.Y., a corporation of Delaware
Filed Nov. 19, 1956, Ser. No. 623,067
10 Claims. (Cl. 324—68)

This invention relates to time measuring systems, and is particularly directed to means for determining the time of occurrence of one event with respect to the time of occurrence of a second event.

In machines and circuits of many kinds the "timing" of events is a constant problem. In "timing" an automobile engine, for example, the occurrence of a spark producing pulse must be adjusted to occur at an optimum time with respect to the rotating crank. Again, in cameras with flash bulb attachments, the closure of the flash bulb circuit must be timed so that the flash occurs while the shutter is open. In these and many other examples, duration and coincidence or relative lag and lead of two or more events must be accurately measured.

One object of this invention is to provide means for determining the relative times of occurrences of two events.

A more specific object of this invention is to provide improved means for measuring the duration of one event, and the timed relation thereof with a second event.

To expedite explanation of the principles of this invention, reference will be made to one specific industrial application for the invention. Camera manufacture is chosen for illustration purposes because of the unique and critical timing adjustments that are required in manufacture to insure the closure of the flash bulb circuit at the proper time with respect to shutter opening time. The objects of this invention are attained by converting the occurrence of one event such as shutter opening to an electric pulse of distinctive amplitude and of a duration corresponding to the duration of that event. A light source and a photo tube aligned through a camera aperture is well adapted for sensing shutter opening. The second event in the example to be described hereinafter is the closure of a flash bulb switch, and this event is likewise conveniently converted to an electric pulse. A diode or diode-type unidirectional device with a first and a second terminal (anode and cathode) is uniquely employed to sense relative timing and lag or lead of contact closure with respect to the beginning of shutter opening. The series diode load resistor, it will be seen, yields the flash bulb contact lag time with respect to the beginning of shutter opening and is applied to a time measuring device. A second time measuring device measures actual shutter open time. These measurements are made reliable and meaningful by another circuit which detects the time required for the flash bulb circuit to deliver sufficient energy, after mechanical switch closure, to ignite the flash bulb.

Other objects and features of this invention will occur to those skilled in the art by referring to the camera testing embodiment described in the following specification, defined in the attached claims, and shown in the accompanying drawing, in which:

FIG. 4 is a set of graphs showing the time relation and voltages of important points in the circuit of FIG. 3.

*General*

Figure 1:
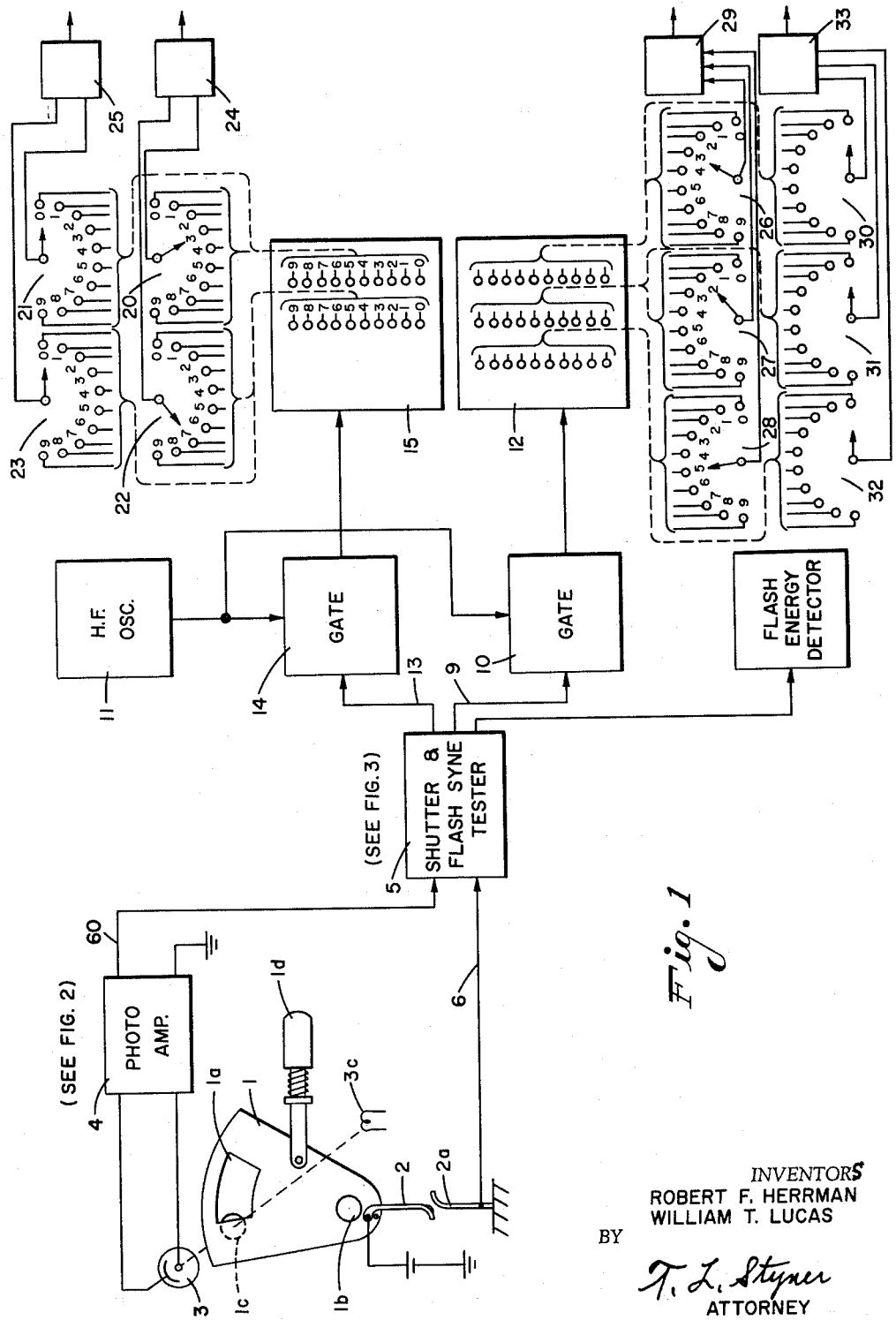
FIG. 1 is a block diagram of the camera testing embodiment of this invention.

In FIG. 1 is shown more or less diagrammatically the shutter mechanism of a typical camera comprising the shutter blade 1 with window 1a hinged on a pivot 1b for selectively opening and closing the light aperture 1c. The specific mechanism for moving the window 1a across the aperture 1c is of no interest in the testing system hereinafter described, and accordingly is not shown. Some manner of trigger mechanism 1d is always employed for manually initiating shutter motion. Usually over-center snap acting springs are employed for the required high speed of the shutter 1. Also, connected to the shutter mechanism is one of a pair of electric contacts shown diagrammatically at 2, which contact closes on stationary contact 2a, preferably at an instant which is just after aperture 1c begins to open.

In high speed camera manufacture, it is desirable to make as many as 10 independent tests of the camera before its approval for shipment and sale. The machine of which the subject invention is a part measures the shutter cocking force, the shutter tripping force for lower limits and for upper limit, the shutter trigger lock for double exposure prevention, and flash contacts for short circuits. Then the following five tests are carried out by the system described below: (1) flash contact energy, (2) flash lagging above limit, (3) flash leading above limit, (4) shutter time below lower limit, and (5) shutter time above upper limit.

Information concerning shutter opening is obtained, in the embodiment shown, by the photocell 3 aligned through the camera aperture 1c with the light source 3c. The photocell 3 is connected into the photocell amplifier 4, the circuitry of which is described in detail below in connection with FIG. 2. The output of the amplifier 4 is applied to the shutter and flash synchronizing tester 5 where the information of the amplifier is compared with the circuit 6 controlled by the flash bulb switch 2—2a. At the output terminal 9 of the synchronization tester appears shutter time information which controls the opening and closing of gate 10 to one input of which is applied the high frequency output of oscillator 11. Oscillations passing the gate are counted by counter 12 to directly display the duration of shutter opening. The output 13 of the sync tester controls gate 14 and the passage of high frequency oscillations from 11 to counter 15. Counter 15 directly displays the duration of the lag between shutter opening and closure of contacts 2—2a, as will appear below.

Counters 12 and 15 are of the type having a plurality of bistable multivibrators or flip-flops arranged in cascade and adapted, preferably, to count in decimal numbers. Each decade of flip-flops has ten terminals which are successively energized as the first ten pulses are applied, whereupon the eleventh pulse causes a carry into the next decade, representative of the next more significant place of a decimal number. Also, it is preferred that ten lights or digit indicators be provided. An accurate decimal count is obtained of all of the high frequency undulations admitted through gates 10 and 14, respectively. The ten terminals of each decade are connected, respectively, to ten points on a selector switch, any point being manually selectable by a wiper. Accordingly, as counting proceeds, pulses successively appear on the terminals 0 to 9 and at contacts 0 to 9 of the connected selector switches. For reasons which will appear, the points of two selector switches are connected in parallel with the terminals of each decade. For example, selector switches 20 and 21 are connected to the "ones" decade of counter 15, and switches 22 and 23 are connected to the "tens" decade. The coincidence circuit 24 is connected to the two wipers of the two selector switches 20 and 22 so that an output pulse will occur only when voltages appear simultaneously at the two wipers of 20 and 22. If now selector switch 20 moved to position "3" and selector switch 22 is moved to position "7," an output from the coincident circuit will occur only when the counter has counted to "73." If the frequency of high frequency oscillator 11 is 10,000 cycles per second, the coincidence output will occur 7.3 milliseconds after gate 14 is opened. Coincidence circuit 25 is connected to the wipers of 21 and 23 and will, likewise, read out a number manually set into those selector switches.

Counter 12 is similar in all respects to counter 15, excepting that three registers are employed instead of two. The terminals of each decade are connected to the corresponding terminals of the selector switches 26, 27, and 28, and the wipers thereof are joined in the three-way coincidence circuit 29. At a counting rate of 10,000 cycles per second, an output signal will occur at the output of coincidence circuit 29, 523 milliseconds after gate 16 is opened, if the selector switches 28, 27, and 26 are respectively set on switch points 5, 2, and 3. Selector switches 30, 31, and 32 are paralleled as shown with 26, 27, and 28, and the wipers are connected to the input of three-way coincidence circuit 33.

The output of coincidence circuits 24 and 25 may be adjusted by presetting switches 20 and 22, and 21 and 23, to produce output signals at predetermined lower and upper limits, respectively, of the flash lag time signal applied to gate 14. Likewise, coincidence circuits 29 and 33 will, by presetting the connected selector switches, produce upper and lower allowable limits, respectively, for the shutter time opening signal applied to gate 10.

Counters 12 and 15 may, if desired, be of the type commercially obtainable from the Berkley Division of Beckman Instruments, Inc., Richamond 3, California, and known as the Berkley Series 5840 Dual Preset Controllers.

Figure 2:
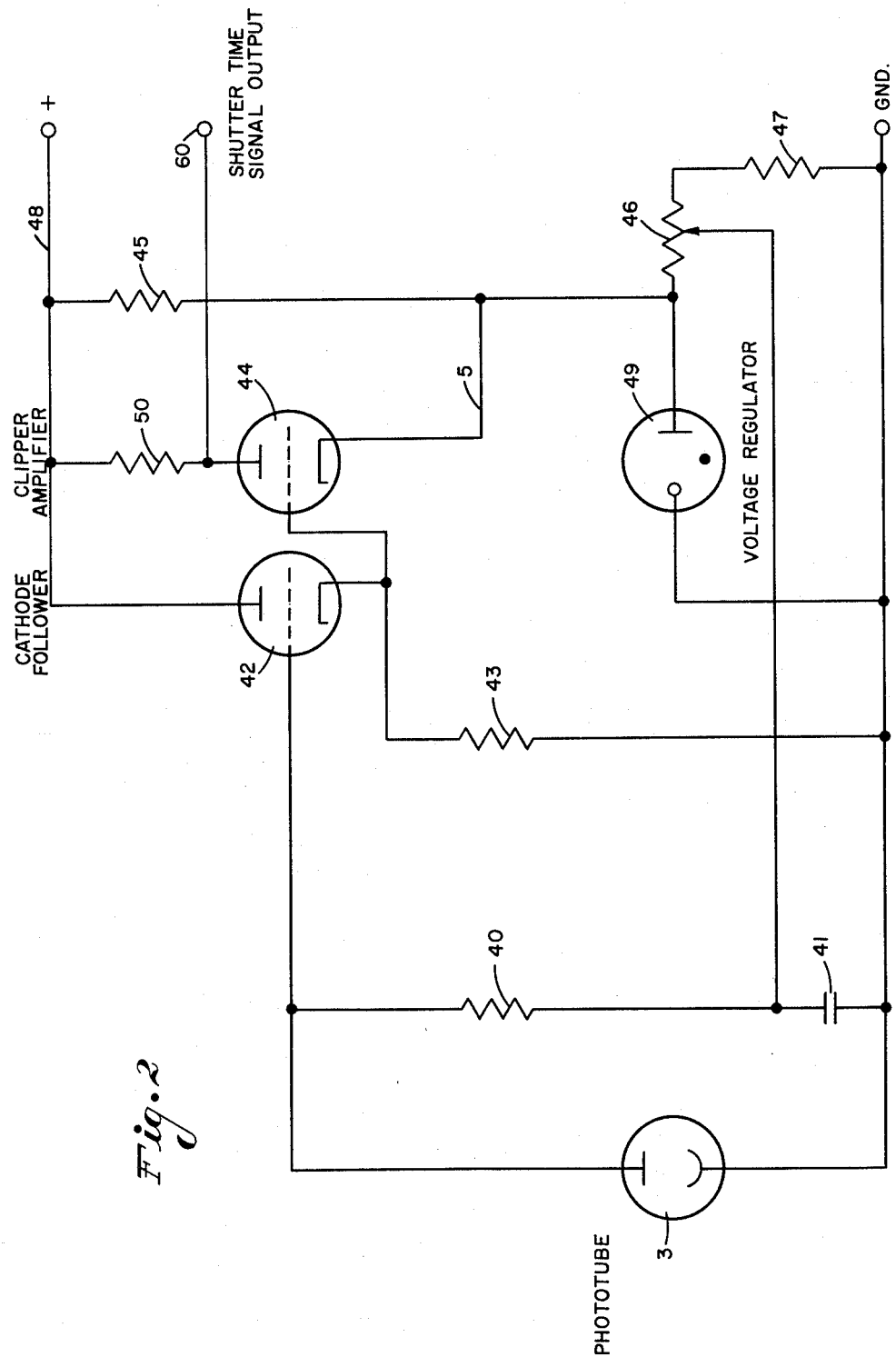
FIG. 2 is a circuit diagram of a photo tube amplifier employed in the system of FIG. 1.

*Photocell Amplifier, FIG. 2*

Since commercially available photo tubes are high impedance devices, usually having a maximum current of the order of 20 microamperes, they should, logically, be coupled into the high impedance of the grid circuit of a vacuum tube amplifier. Unfortunately, the characteristics of a triode, particularly the cutoff grid-cathode voltage, vary with age and with changes in anode voltage. According to this invention, the anode of photo tube 3 is connected through the high load resistance 40 to a source of voltage which appears across filter condenser 41. The photo tube anode is connected to the grid of the cathode follower 42. The cathode end of the cathode resistor 43 is connected directly to the grid of the clipper-amplifier 44. The potentiometer comprising resistances 45, 46, and 47 is connected across the anode source 48 and is tapped to the cathode of clipper 44, and the grid of 42 as shown. If the anode voltage changes, the cathode potential above ground will change accordingly, and would ordinarily be expected to change the required cutoff voltage applied to the grid of the clipper. According to this invention, however, the potentiometer resistance 46 is variably tapped for supplying a bias to the cathode follower grid. Since any drift in the static bias of the grid of 42 is followed by a like drift of the cathode of 42 and grid of 44, and since all points on the potentiometer 45, 46, 47 are serially connected and will change together, any drift in the anode source changes but little the static bias between the grid and cathode of 44.

To still further minimize the effects of changes in voltage at the cathode and grid of 44, the voltage regulator tube 49 is connected across that section of the potentiometer which supplies the cathode and grid bias. Should the terminal voltage of tube 49 change with age or should the tube be replaced with a tube of different characteristics, causing a change in voltage across 46—47, the grid and cathode voltages would be similarly changed, thus not disturbing the clipping action of the clipper amplifier.

In operation, as light on the photo tube increases, the photo tube draws increasing current, causing the drop through 40 to increase. The voltage of the grids of tubes 42 and 44 becomes more negative with respect to their cathodes, and the current through the plate load resistor 50 decreases. The current through 50 can decrease to zero at cutoff. Hence, further increase in the amount of light can have no further effect. The output signal taken from across 50 becomes more positive with respect to ground when light falls on the photo tube, and remains constant when the light has increased beyond the point where 44 is cut off. Conveniently, the clipping level is adjusted by the wiper contact on 46. 46 may be adjusted to produce a sharp cutoff of 44 for even the weakest photo tube signal, the signal output being substantially square-cornered as shown by voltage graph G, of FIG. 4. The output terminal is at 60.

Figure 3:
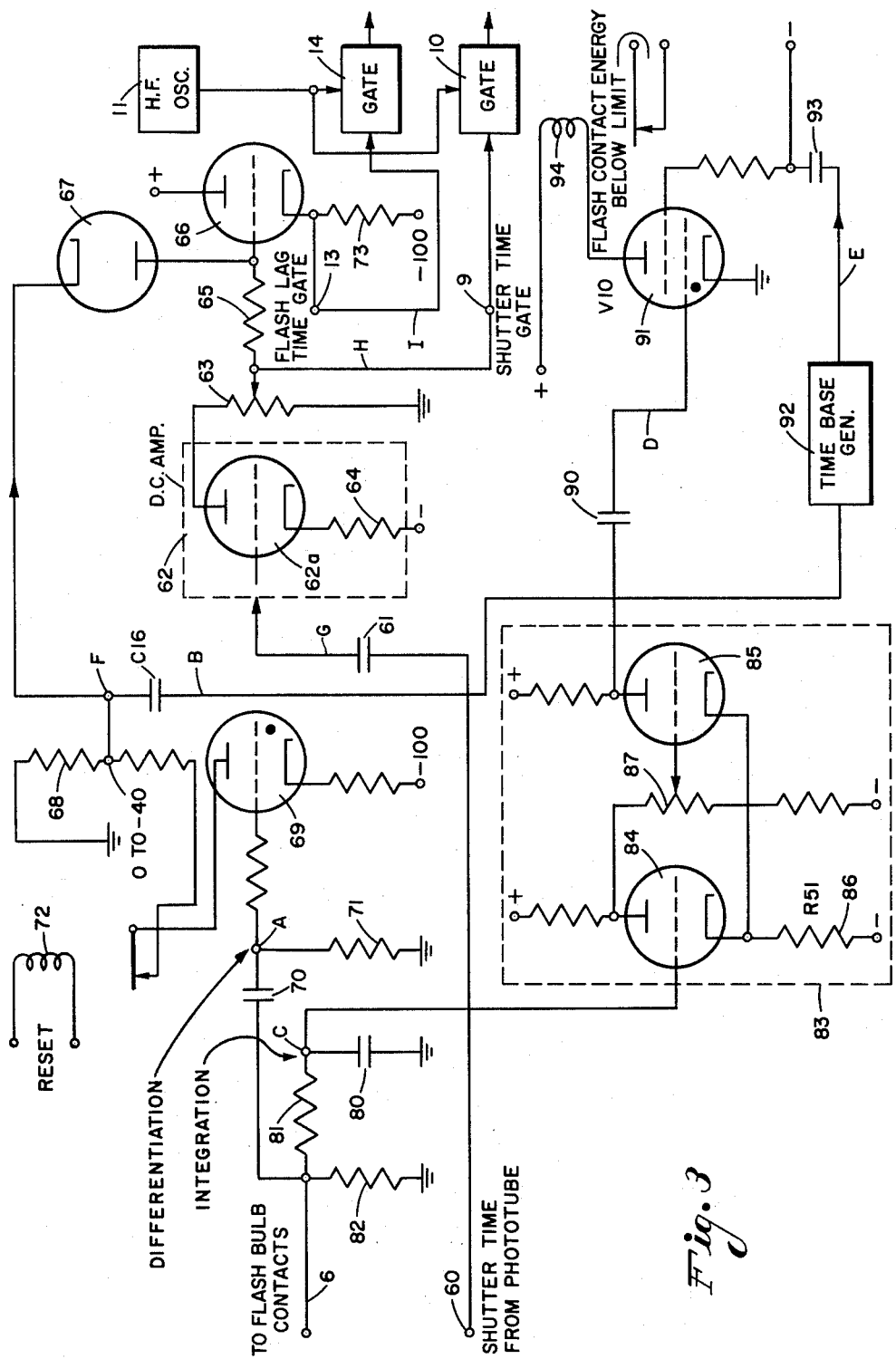
FIG. 3 is a circuit diagram of the shutter and flash synchronization tester of FIG. 1.

*Shutter and Flash Synchronization Tester, FIG. 3*

The tester 5 for shutter and flash synchronization is shown in enlarged detail in FIG. 3. The output of the photo tube amplifier at terminal 60 is coupled through condenser 61 to the input of the D.C. amplifier 62. Capacitor 61 is of relatively high capacity to apply the photo tube output with substantially no distortion to the D.C. amplifier. The important characteristic of amplifier 62 in these circuits resides in the last stage, 62a, thereof. The anode load resistor 63 is connected to ground and the amplifier cathode is connected through the cathode resistor 64 to a high negative potential. Accordingly, all points on the anode load resistor will vary between ground potential and some negative potential depending upon the space current flowing in the amplifier. For purposes of discussion, a midpoint on the resistor 63 is selected which will swing between 0 and —40 volts. Such a voltage is graphed at H in FIG. 4. This voltage H is applied to gate 10, which as explained above opens and closes in response to signal H to admit the output of high frequency oscillator 11 to counter 12.

Coupling resistor 65 is connected between an intermediate point of resistor 63 and the grid of cathode follower 66. According to an important feature of this invention, the grid of 66 is controlled by the IR drop produced through resistor 65 by the rectifier 67. Whether the rectifier is conductive and whether current is drawn through 65 depends on whether the cathode of 67 is at a potential below the anode of 67. The potential of the diode-anode is controlled by the shutter signal, while the diode-cathode is controlled by the flash bulb circuit. The cathode of 67 is connected to the load resistor 68 in the anode circuit of the grid controlled gas tube or "Thyratron" 69. The grid of the gas tube 69 is in turn controlled by the flash bulb contacts. The flash bulb signal is differentiated by condenser 70 and resistor 71 to produce a sharp voltage spike on the grid, as shown at A in FIG. 4, to abruptly initiate a gaseous discharge upon closure of the flash bulb contacts. Once discharge has been started, it continues, and can be interrupted only by open circuiting the plate circuit, as with relay 72.

Gas tube 69 with its plate load resistor 68 is connected between ground and a negative voltage which in the example shown is —100 volts, with the result that when 69 fires the voltage at its plate goes negative. The value of the resistance 68 with respect to the other resistances in series therewith, is so chosen in the example mentioned that the cathode of diode 67 is driven to —40 volts when 69 is conducting. As mentioned, the shutter voltage is applied to the plate of the diode 67 through resistor 65. When the diode cathode is at 0 potential, the plate will assume whatever value the shutter voltage dictates, since the diode will not conduct with the plate voltage equal to or more negative than the cathode.

However, when the diode cathode is driven negative, the diode plate will be held negative by virtue of the diode conduction. Resistor 65 absorbs the voltage drop when the shutter voltage at the anode of 62a is 0 and the cathode is at —40 volts. If, now, the shutter opens before the flash contacts close, meaning lagging flash, the diode plate voltage goes from —40 to 0 volts. The diode plate will revert to —40 volts when the flash contacts close by virtue of the conduction of 67 and the drop through 65. Under such conditions, cathode follower 66 conducts more current and the cathode end of resistor 73 rises from, say, —40 to 0 volts. This conduction endures from time $t_2$ to $t_0$, as shown by curve I in FIG. 4. The cathode follower 66 gates "on" the counter 15 during this interval, permitting the counter to measure the time of the flash lag. If the flash contacts close before the shutter opens, meaning a leading flash, the diode plate remains at —40 volts, never admitting a gating voltage to the gate 14. It is assumed in the example mentioned that no flash lead is tolerated, and that maximum and minimum limits of flash lag is manually set into the counter 15 so that an output voltage occurs at coincidence circuit 24 or 25 when the limits are exceeded. The output signals of circuit 24 and 25 may operate an alarm or actuate rejection mechanism for kicking aside the camera with shutter mechanism in which the flash lag is out of limits. With the selector switches of FIG. 1, the minimum and maximum flash lag are easily selected.

*Flash contact energy, FIG 3*

For simplification of disclosure, it has been assumed up to this point, that the flash circuit contacts close instantaneously. However, contacts which may be of substandard materials, or which are dirty, or chatter, may exhibit considerable contact resistance, and require considerable time to deliver the required energy to effect the load (flash bulb). This will cause an excessive delay of the light output peak, which would not be predicted by only measuring the time of occurrence of mechanical closure. According to this invention, the current through the switch contacts under test is integrated over a predetermined period of time to determine whether required energy is passed within a given time period after mechanical closure. To this end, the relatively large integrating condenser 80 and resistance 81 are connected across the resistance 82 and hence across the flash bulb contacts. Resistance 82 is of a value about equal to the flash bulb resistance into which the flash circuit contacts must work. If, for example, a minimum energy of 10 milliwatt-seconds must be delivered to the load within 3 milliseconds after contact closure, then the average power dissipated by the load under this condition is 3.33 watts, which is equivalent to about 4.08 volts average across the load. Capacitor 80 connected across the load in series with resistance 81 starts to charge up when votlage appears across the load. The time constant RC of this combination is 10 milliseconds in the example assumed. If a constant voltage of 4.08 volts appears across the load, the voltage across condenser 80 will rise exponentially from zero to 1.06 volts in 3 milliseconds. This voltage is delivered to the input of the trigger circuit 83 which may be, by way of example, of the Schmitt type. The trigger circuit shown will produce a distinct positive-going pulse when the input voltage from condenser 80 reaches a predetermined threshold of value which is 1.06 volts, in the example assumed. The particular Schmitt trigger circuit shown comprises the triodes 84 and 85 with a common cathode resistor 86 and direct coupling through potentiometer 87 between the output of 84 and the input of 85. 84 is normally cut off while 85 is conducting. The threshold of the trigger circuit is adjusted so that when the voltage across condenser 80 reaches 1.06 volts the circuit is triggered, causing 84 to conduct and 85 to block. At the time of triggering, a positive voltage pulse is delivered from the plate of 85 through coupling condenser 90 to one input of a coincidence circuit such as one grid of the double-grid-controlled gas tube, or "Thyratron," 91. This "Thyratron" cannot fire even though grid No. 1 is at firing potential, unless the voltage of grid No. 2 is at least 0 with respect to its cathode. Grid No. 2 is normally biased negatively. However, the negative pulse generated by "Thyratron" 69 at the time of flash contact closure, triggers the time base generator 92 which generates a positive pulse of about 3 millisecond duration. The time base generator may be of many known constructions, of which the "phantastron" has been found to be reliable and quite effective. This 3 millisecond pulse is delivered through coupling condenser 93 to the No. 2 grid of "Thyratron" 91, holding the No. 2 grid at at least zero potential for 3 milliseconds.

If good contact is made by the flash contacts, the voltage across the load resistor 82 will be 4.08 volts or more, causing the voltage across condenser 80 to reach the threshold value of 1.06 volts in 3 milliseconds or less after contact closure. See waveform C in FIG. 4. Grid No. 1 of "Thyratron" 91 will therefore receive a positive pulse from 85 during the time grid No. 2 is held positive, causing 91 to fire and remain conducting. The output of the "Thyratron" will remain energized, opening or closing contacts to indicate that the voltage build-up on condenser 80 was within the time required.

If, however, the contacts have high resistance due to dirt, poor tension, or if they chatter, the average voltage across load resistance 82 will be less than 4.08 volts and more than 3 milliseconds will be required for the voltage across condenser 80 to reach the threshold value. See waveform C, second case, FIG. 4. By this time, however, grid No. 2 of "Thyratron" 91 has been driven back to its negative value by the time base generator, and 91 will not fire, allowing contacts of relay 94 to remain undisturbed. During read-out, such absence of change of contacts at 94 is interpreted by mechanisms not shown to reject the camera with the defective contacts.

Since the effective closure time of defective switch contacts in the flash bulb circuit may be appreciable compared to shutter open time, it is important for reliable reading of the shutter time gate and flash lag time gate that the effective electrical closing time after mechanical closure be known.

Accordingly, the timing system of this invention reliably measures the duration of one event, such as shutter open time, and the instant of a second event, such as flash bulb contacts closure, with respect to the beginning of the first event. The timing system of this invention could be employed for measuring the time of occurrence of ignition voltages with respect to the position of a piston in an internal combustion engine. Many uses in industry will occur to those skilled in the art, where quantitative measures of time periods are required.

Other objects and features of this invention and modifications thereof will occur to those skilled in the art. Accordingly, the specific circuitry and parameters thereof are not to be construed as limitative of the invention defined in the following claims.

What is claimed is:

1. A system for comparing the duration and coincidence in time of two independent events, means for producing one distinctive voltage, the beginning and termination of the production of said one voltage defining the duration of one event, means for producing a second distinctive voltage at the beginning of the second event, a diode-type unidirectional device with a first and a second terminal, means applying said one distinctive voltage to said one terminal, and means applying said second distinctive voltage to said second terminal, and time-measuring means responsive to current through said unidirectional device for measuring the duration of conduction therethrough.

2. In combination in a synchronizing circuit, a diode, a load resistance in series with the diode, an output terminal at the junction of the resistance and diode, a first and a second signal source connected to opposite ends of said series circuit, the first and second signal sources each being capable of producing a distinctive high and low voltage characterized by sharp steps from the low to the high voltages so that the time of conduction of said diode is sharply defined when the higher voltage of one source coincides in time with the lower voltage of the other source in a manner to cause conduction.

3. In combination in a time measuring system, a diode, a load resistor in series with said diode, an output terminal at the junction of said diode and resistor, a first signal source and a second signal source coupled respectively to opposite ends of the series diode-resistor and capable of two distinctive, sharply defined voltages; the first signal source being responsive to a non-recurring event, and the second signal source being responsive to a recurring event, the first and second signals being so polarized with respect to the diode terminals that when said first signal is applied neither voltage of said second signal can produce conduction through the diode.

4. A synchronization tester having two input terminals, a differentiating circuit connected to one terminal, a relay coupled to said differentiating circuit; a diode-type rectifier, the cathode-terminal of said rectifier being coupled to said relay and the anode-terminal being coupled to the other of said input terminals so that said rectifier will conduct only when voltages of predetermined polarity are simultaneously applied to the cathode terminal and the anode terminal; and means for sensing current through said rectifier.

5. The synchronization tester defined in claim 4, further comprising a counter, a gate coupled between said sensing means and said counter, and a high frequency generator coupled to said counter through said gate.

6. A shutter and flash bulb contacts synchronization tester for cameras comprising a diode-type rectifier, a differentiating circuit and a lock-up relay coupled between the cathode terminal of said rectifier and the contacts of the flash bulb circuit to be tested, a light source and a photocell for sensing shutter open time, the anode terminal of said rectifier being coupled to the photocell, means for detecting current through said rectifier; two counters, a high frequency source, a first and second gate coupled, respectively, between said counters and said high frequency source, one gate being responsive to said photocell signal to measure shutter open time, and the other gate being coupled to said sensing means for measuring flash lag time; and means for detecting slow closure of flash bulb circuit contacts comprising integrating means coupled to said contacts, a coincidence circuit with two inputs, a time base generator capable of producing a rectangular pulse of measured length in response to a trigger voltage, one input being coupled to said time base generator which in turn is triggered by said differentiating circuit, the other input circuit being coupled to said integrating circuit.

7. A shutter and flash bulb contact synchronization tester for cameras comprising a first terminal for connecting to the flash bulb contacts of the camera to be tested, a second terminal for connecting to shutter open sensing means of said camera to be tested; means connected to said second terminal for measuring shutter open time, a differentiating circuit coupled to said first terminal for producing a distinct pulse to mark the initial mechanical closure of said flash bulb contacts, means coupled to both the first and second terminals for measuring the time of occurrence of said initial closure of the flash bulb contacts with respect to the shutter open period; and means for quantitatively measuring the period of time from said initial closure for the contacts to conduct a predetermined current, the last mentioned means comprising an integrating circuit connected to said first terminal, a time base generator responsive to said differentiating circuit, a coincidence circuit with two control circuits and an output crcuit, said input circuits being coupled, respectively, to said time base generator and to said integrating circuit for producing a significant output signal if the integrated voltage rises to a predetermined level during the period measured by said time base generator.

8. A tester for measuring the rate of energy build-up when a voltage source is connected to a predetermined load through a switch, said tester comprising an RC time-constant circuit for connection to said switch for integrating the current build-up after switch closure, means for differentiating the voltage produced at the instant of initial switch closure, a generator of a pulse of predetermined duration, said generator having a trigger circuit responsive to the differentiating means, a coincidence circuit coupled and responsive to said time-constant circuit and to said pulse generator.

9. A tester for switch contacts connected between a voltage source and a flash-bulb load, said tester comprising a resistor about equal in value to said load and adapted to be connected through the contacts of said switch contacts to said voltage source, means for integrating the voltage build-up across said resistor after contact closure, means connected to said resistor for differentiating the voltage produced upon contact closure, a generator of a pulse of a predetermined duration coupled to and responsive to the mentioned differentiating means; a coincidence circuit, said coincidence circuit having two inputs connected, respectively, to said pulse generator and to said differentiating means so that a distinctive signal appears at the output of said coincidence circuit when the integrating and differentiating signals voltages arrive at the same time at said input circuits.

10. A waveform tester for measuring the rate of rise of current between a current source and a load after closure of a switch, said tester comprising a terminal for connection to said switch, a differentiating circuit coupled to said terminal for producing a voltage spike at the instant of switch closure, an integrating circuit connected to said terminal for producing a variable voltage as a function of time, a relay connected to said differentiating means, a square wave time base generator coupled to said differentiating circuit for initiating a square wave at the instant of said voltage spike, a coincidence circuit having two input circuits and an output circuit with one input circuit coupled to said time base generator and with the other input circuit coupled to said integrating means, and an indicator coupled to said output circuit.

References Cited in the file of this patent

UNITED STATES PATENTS

| | | |
|---|---|---|
| 2,274,158 | Penther | Feb. 24, 1942 |
| 2,370,134 | Begun | Feb. 27, 1945 |
| 2,405,073 | Troell | July 30, 1946 |
| 2,481,912 | Dorsman | Sept. 13, 1949 |
| 2,572,788 | Weighton | Oct. 23, 1951 |
| 2,738,461 | Burbeck | Mar. 13, 1956 |
| 2,779,870 | Henry | Jan. 29, 1957 |
| 2,904,726 | Ricketts | Sept. 15, 1959 |

OTHER REFERENCES

"Electronic Instruments for Production Testing of Camera Shutters," R. W. Lavender, Electrical Engineering, April 1953, pages 336 to 340.